Mar. 3, 1925.　　　　　　　　　　　　　　　　1,528,372
C. A. GOUTY
TROLLEY
Filed Sept. 24, 1923
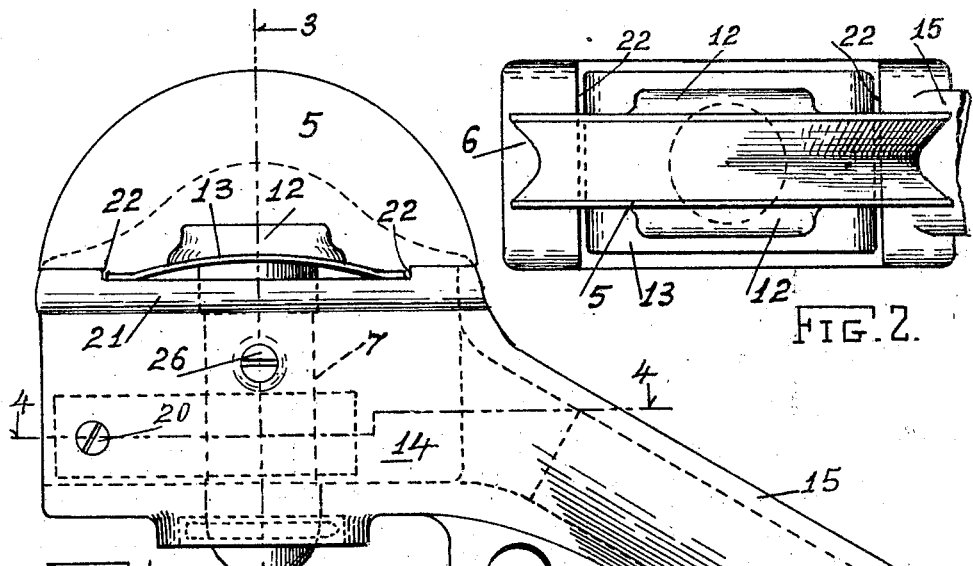
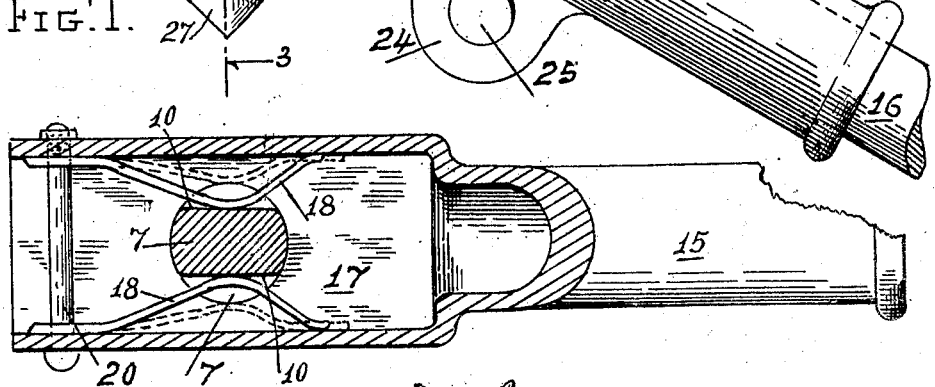
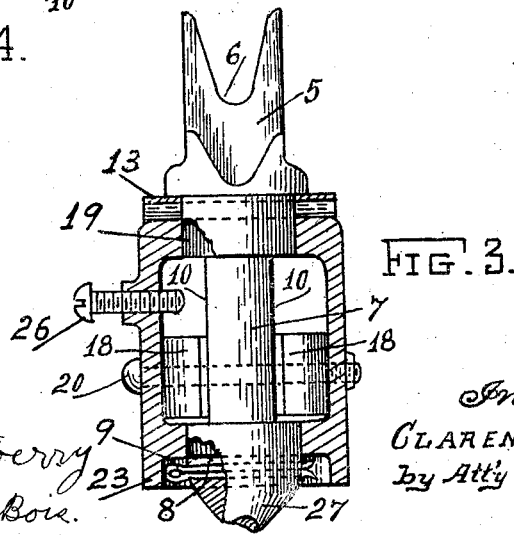
Witnesses.
A. R. Atteberry
Charlotte A. DuBois.
Inventor
CLARENCE A. GOUTY
by Att'y N. DuBois.

Patented Mar. 3, 1925.

1,528,372

UNITED STATES PATENT OFFICE.

CLARENCE A. GOUTY, OF BUSHNELL, ILLINOIS, ASSIGNOR OF ONE-THIRD TO SAMUEL T. BAUMANN, AND ONE-THIRD TO DONALD RAY COPELAND, BOTH OF BUSHNELL, ILLINOIS.

TROLLEY.

Application filed September 24, 1923. Serial No. 664,536.

*To all whom it may concern:*

Be it known that I, CLARENCE A. GOUTY, a citizen of the United States, residing at Bushnell, in the county of McDonough and State of Illinois, have invented a new and useful Trolley, of which the following is a specification.

The invention relates to trolleys such as are used in connection with electric cars or locomotives.

The purposes of the invention are to provide a light, compact and serviceable trolley which may be produced at relatively small cost, will be flexible and dependable in use, and in which parts subject to wear may be easily and quickly replaced.

The invention consists in the improved structural details shown in the accompanying drawing, to which reference is hereby made, and now to be described and finally recited in the claims.

Figure 1 is a side elevation of a trolley embodying my invention; Fig. 2 is a top plan of the same trolley; Fig. 3 is a transverse section through the trolley harp taken on the line 3—3 of Fig. 1, the shoe and its spindle being shown in elevation; and Fig. 4 is a vertical section through the trolley taken on the line 4—4 of Fig. 1. The same reference numerals designate the same parts in all the views.

The shoe proper and its spindle will preferably be made of manganese steel, or other hard metal smoothly finished and polished to run on the transmission line without undue wear or other injury to the line. The harp and appurtenances will preferably be made of brass.

The shoe 5 is a half oval in shape as shown and has a groove 6 extending a considerable distance around the shoe and shaped to receive the transmission line; a spindle 7 integral with the shoe and having flat faces 10 and a tapered terminal member 27 having a transverse hole 8 to receive a cotter pin 9; and integral lateral members 12 bearing on an arched contact spring 13. The tapered extremity 27 of the spindle 7 serves to spread the springs 18 apart from each other when it is pushed downward between the springs. The harp 14 has a downwardly inclined tubular member 15 in which the trolley pole 16 is inserted; an internal lengthwise chamber 17 accommodating inwardly extended springs 18 spaced apart from each other so that when the spindle is inserted through the hole 19 in the upper part of the harp, the tapered part 27 of the spindle will spread the springs apart until the tapered part passes downward beyond the springs, whereupon the springs will come in contact with the flat faces 10 of the spindle, so that if the spindle be oscillated either right or left, the springs will be stressed and will act simultaneously to return the spindle to its normal position in the vertical longitudinal axis of the harp.

The springs are secured in the harp by a transverse bolt 20 extending through both springs.

The harp has a flat upper surface and longitudinal laterally extending re-inforcing members 21 having shoulders 22 on which the ends of the contact spring 13 engage to prevent excessive flattening of the spring and to prevent rotation of the spring on the harp; an annular rim member 23 protecting the cotter pin 9; and an eye member 24 integral with the harp and having an eye 25 to receive the usual trolley rope.

The scope of oscillations of the shoe 5 is controlled by a screw 26 the inner end of which is advanced toward or withdrawn from the flat face of the spindle to adjust the scope of oscillation of the shoe as may be desired.

In practice the screw 26 will be adjusted to permit the shoe to round the shortest curve of the line and the shortest curve of the switches on the line. When the trolley is running on a straight line-wire the trolley will be neutral, that is to say, the springs 18 will bear alike on the respective flat faces 10 of the spindle 7.

If the line, or switch thereon tends to the right it will guide the shoe to the right thereby increasing the stress of both springs and if the line or a switch thereon tends to the left it will guide the shoe to the left and thereby increase the stress of both springs and when the shoe again runs in a straight line the two springs will co-act to keep the shoe in neutral or straight line position.

I am aware that shoes sliding on the line wire, as distinguished from grooved wheels rolling on the line wire have been used. I therefore do not claim broadly the use of a sliding shoe.

The mode of operation is obvious from the foregoing description.

Having fully described my invention; what I claim as new and desire to secure by Letters Patent is:

1. In a trolley for electric lines, the combination of an oscillative arched shoe of hard metal finished smoothly and polished to slide on the transmission line with minimum wear on the line and having an approximately semi-circular groove to receive the transmission line, also having a spindle with opposite flat faces and a tapered terminal; a harp having a lengthwise chamber; and springs inside said chamber pressed apart from each other by the tapered terminal member of the spindle during inward movement of the spindle and bearing on the respective flat faces of said spindle, stressed by partial rotations of the spindle, either clockwise or counter clockwise, and acting jointly to return the spindle to neutral position after each partial rotation of the spindle.

2. In a trolley, the combination of a harp having a flat upper surface, laterally projecting shouldered re-enforcements, and a bore at right angles to the plane of the flat upper surface of the harp; a shoe having a spindle rotative in said bore of the harp, also having arched laterally projecting contact members; and an arched spring contacting with the under side of said laterally projecting members of the shoe and engaging the shoulders of said laterally projecting re-enforcements of the harp, to prevent rotation of the spring on the harp.

3. In a trolley, in combination with a harp having a flat upper surface and a bore at right angles to said flat upper surface; a shoe having a spindle oscillative in said bore of the harp, said spindle having opposite flat faces and a tapered terminal member; springs in the harp spread apart from each other by said inwardly moving tapered terminal member and engaged by the respective opposite flat faces of said spindle to stress the respective springs and acting to return the spindle to neutral position after each partial clockwise rotation of the spindle and after each partial counter-clockwise rotation of the spindle.

4. In a trolley, in combination with a harp having a flat upper surface and a bore at right angles to said flat upper surface; an oscillative half-oval grooved shoe having its spindle in said bore of the harp, said spindle having opposite flat faces, springs in the harp engaged by the respective flat faces of said spindle to stress the springs, said springs acting to return the shoe to neutral position immediately after each partial rotation of the spindle; and an adjustable stop engaging the spindle to control the scope of the oscillations of said shoe.

In witness whereof, I have hereunto signed my name at Bushnell, McDonough County, Illinois, this 30th day of June A. D. 1923.

CLARENCE A. GOUTY.

Witnesses:
S. T. BAUMANN,
RAY COPELAND.